United States Patent
Zhurakhinskaya

(10) Patent No.: US 10,817,840 B2
(45) Date of Patent: Oct. 27, 2020

(54) USE OF A VIRTUAL PERSONA EMULATING ACTIVITIES OF A PERSON IN A SOCIAL NETWORK

(75) Inventor: Marina Zhurakhinskaya, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1802 days.

(21) Appl. No.: 11/765,108

(22) Filed: Jun. 19, 2007

(65) Prior Publication Data

US 2008/0320040 A1     Dec. 25, 2008

(51) Int. Cl.
*G06Q 10/10* (2012.01)
*G06Q 50/00* (2012.01)

(52) U.S. Cl.
CPC ............. *G06Q 10/10* (2013.01); *G06Q 50/01* (2013.01)

(58) Field of Classification Search
CPC ........ G06Q 10/10; G06Q 50/01; G06F 16/00; G06F 19/00; G06Z 99/00
USPC .............................................. 705/1, 1.1, 319
See application file for complete search history.

(56) References Cited

U.S. PATENT DOCUMENTS

| | | | | |
|---|---|---|---|---|
| 6,006,268 | A | * | 12/1999 | Coile ....................... H04L 1/16 709/203 |
| 2001/0051876 | A1 | * | 12/2001 | Seigel et al. ..................... 705/1 |
| 2002/0111942 | A1 | | 8/2002 | Campbell et al. |
| 2005/0086126 | A1 | * | 4/2005 | Patterson ....................... 705/26 |

(Continued)

OTHER PUBLICATIONS

AllBusiness; ProfileLinker Launches Socail Networking Aggregation Service. <http://www.allbusiness.com/services/business-services/4005701-1.html (printed)> Jan. 4, 2007 Mar. 15, 2010.*

(Continued)

*Primary Examiner* — Tamara Griffin
*Assistant Examiner* — Shaun D Sensenig
(74) *Attorney, Agent, or Firm* — Lowenstein Sandler LLP

(57) ABSTRACT

The present invention provides methods and system that allow a first person to create a virtual persona of another person in an open overlay service. The virtual persona is virtual in that it makes it appear that the person is a subscriber of the open overlay service even if that person does not have a real account with the open overlay service. The real person may or may not have their own account on the open overlay service. The virtual persona allows its creator to easily follow the activities, such as blog updates, RSS feeds, etc., on online services of the other person without having to establish accounts at these services or visit these services regularly checking for updates. The virtual persona also serves as a template for a pre-configured account that may be issued to the real person. For example, after establishing the virtual persona, the creator may send an invitation to the real person being emulated. Upon accepting, the settings of the virtual persona are transferred to an account preconfigured for the real person and that person may then continue to use the services already established. The creator of the virtual persona remains in control of the virtual persona and may choose to remove it once the real person joins the open overlay service. However, the creator of the virtual persona may continue to use it for various reasons. Future changes to the account of the real person do not affect virtual persona profile and vice versa.

22 Claims, 5 Drawing Sheets

(56) References Cited

U.S. PATENT DOCUMENTS

| | | | |
|---|---|---|---|
| 2005/0216300 A1* | 9/2005 | Appelman | G06Q 10/10 705/319 |
| 2006/0074806 A1* | 4/2006 | McKegney | G06Q 30/0601 705/51 |
| 2006/0143136 A1* | 6/2006 | Low et al. | 705/64 |
| 2006/0156389 A1* | 7/2006 | Brown | G06F 21/552 726/5 |
| 2007/0106627 A1 | 5/2007 | Srivastava et al. | |
| 2007/0130347 A1* | 6/2007 | Rangan | G06Q 10/10 709/227 |
| 2007/0175973 A1* | 8/2007 | Mittal et al. | 235/375 |
| 2008/0228775 A1* | 9/2008 | Abhyanker et al. | 707/10 |
| 2010/0274815 A1* | 10/2010 | Vanasco | G06Q 10/107 707/798 |

OTHER PUBLICATIONS

Identity Theft. Pennsylvania Office of The Attorney General <http://web.archive.org/web/20060205235907/http://www.attorneygeneral.gov/consumers.aspx?id=289. Feb. 6, 2006 Jul. 21, 2012.*

* cited by examiner

USE OF A VIRTUAL PERSONA EMULATING ACTIVITIES OF A PERSON IN A SOCIAL NETWORK

FIELD OF THE INVENTION

The invention relates generally to online social networks.

BACKGROUND OF THE INVENTION

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). Many of these sites try to build communities around multimedia or popular culture, such as television, film, music, etc. These sites and their features are designed to keep users clicking on advertising-supported pages of the site. Thus, the known social networking sites employ a closed platform of services that attempt to keep their user-base captive to the site.

Unfortunately, it can be difficult for users to maintain their multiplicity of accounts for their social networks. For example, users can have multiple profiles at multiple sites for their music, email, instant messaging, etc. However, most users eventually do not keep up with all of their accounts. For example, many users have four or five e-mail addresses, but essentially may use only one or two of them.

Indeed, the Internet is crowded with a large number of social networking sites and sharing tools. For example, the recent supremacy of iTunes has triggered a plethora of music service offerings. As another example, the recent success of YouTube and Google Video has sparked an explosion of video-sharing sites.

Unfortunately, due to their current business model, the known social network sites are vulnerable to spammers and other forms of fraud. Many closed social networking sites will likely become abandoned or a major hassle for users to maintain. Thus, many users are constantly going through cycles of joining and discarding (or neglecting) their memberships to social network sites.

One of the main reasons users subscribe to social networking sites is to interact and track the activity of their friends. This means users benefit more when more of their friends are subscribed to the same site. However, a person's friends may not be immediately interested in subscribing to a particular site, because they don't know if they will use the site and don't want to go through the process of setting up yet another account. Even if they do join, many people tend to leave their account at minimal settings, with most of the features of membership not used or configured. Conversely, a person might not want to join or constantly visit all the sites used by their friends.

Accordingly, it may also be desirable to provide methods and systems that allow a user to track the activity of their friends without waiting on their friends to join the same service and without joining or visiting multiple services used by their friends. It may also be desirable to allow a user to invite other users and provide a way to easily set up their accounts after accepting an invitation.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The present invention provides methods and system that allow a first person to create a virtual persona of another person in an open overlay service. The virtual persona is virtual in that it makes it appear that the person is a subscriber of the open overlay service even if that person does not have a real account with the open overlay service. The real person may or may not have their own account on the open overlay service. The virtual persona allows its creator to easily follow the activities, such as blog updates, RSS feeds, etc., on online services of the other person without having to establish accounts at these services or visit these services regularly checking for updates. The virtual persona also serves as a pre-configured account that may be copied to create an account for the real person. For example, after establishing the virtual persona, the creator may send an invitation to the real person being emulated. The real person can view the virtual persona profile settings as well as the activity updates generated by the service. Upon accepting the invitation, the real person receives the pre-configured account with the settings copied from the virtual persona and, optionally, the activity updates history from the virtual persona. The creator of the virtual persona remains in control of the virtual persona, but may choose to remove the virtual persona after the real person joins the service. Alternatively, the creator of the virtual persona may choose to maintain it for various reasons even after the real person has joined the service. The visibility of the virtual persona may be restricted in various ways. For example, it may be visible to only the creator or other users of the open overlay service. In addition, the virtual persona may become visible to the real person being emulated, if they were invited to view it, perhaps for the purpose of assisting their decision to join open overlay service.

Reference will now be made in detail to the exemplary embodiments of the invention, which are illustrated in the accompanying drawings. Wherever possible, the same reference numbers will be used throughout the drawings to refer to the same or like parts.

Figure 1:
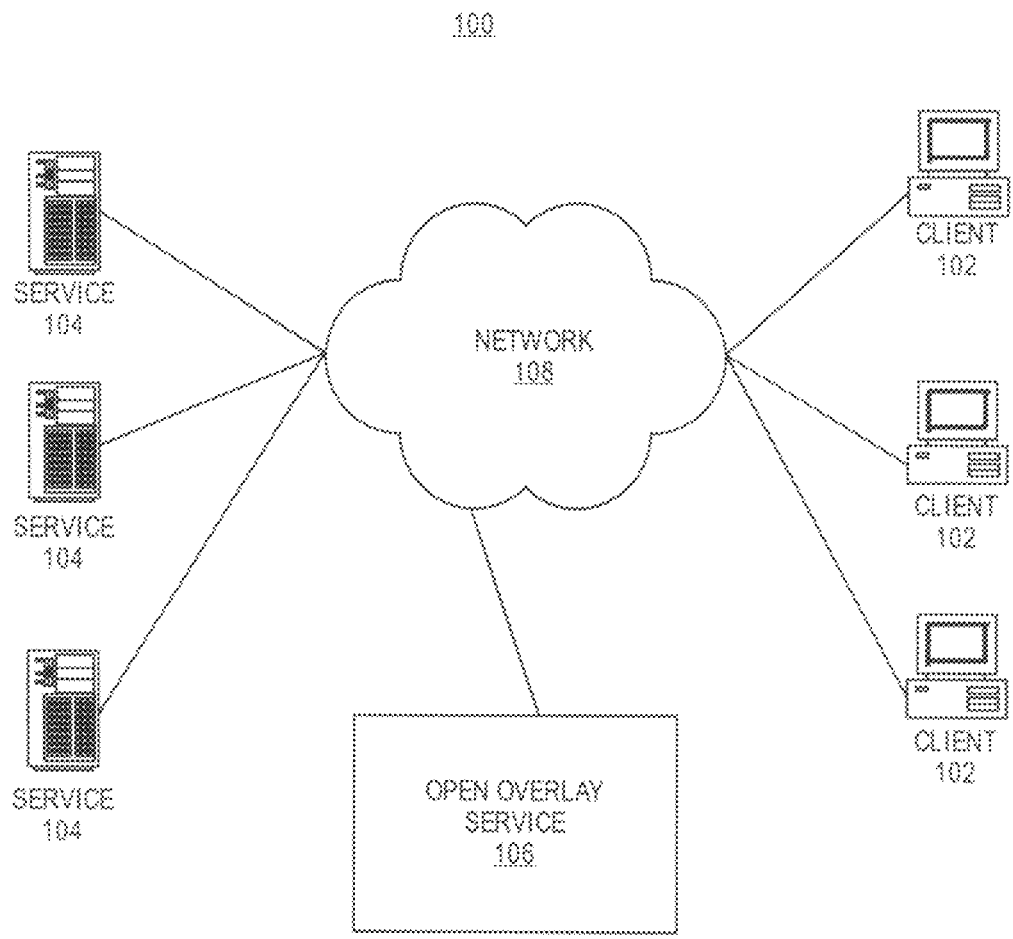
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
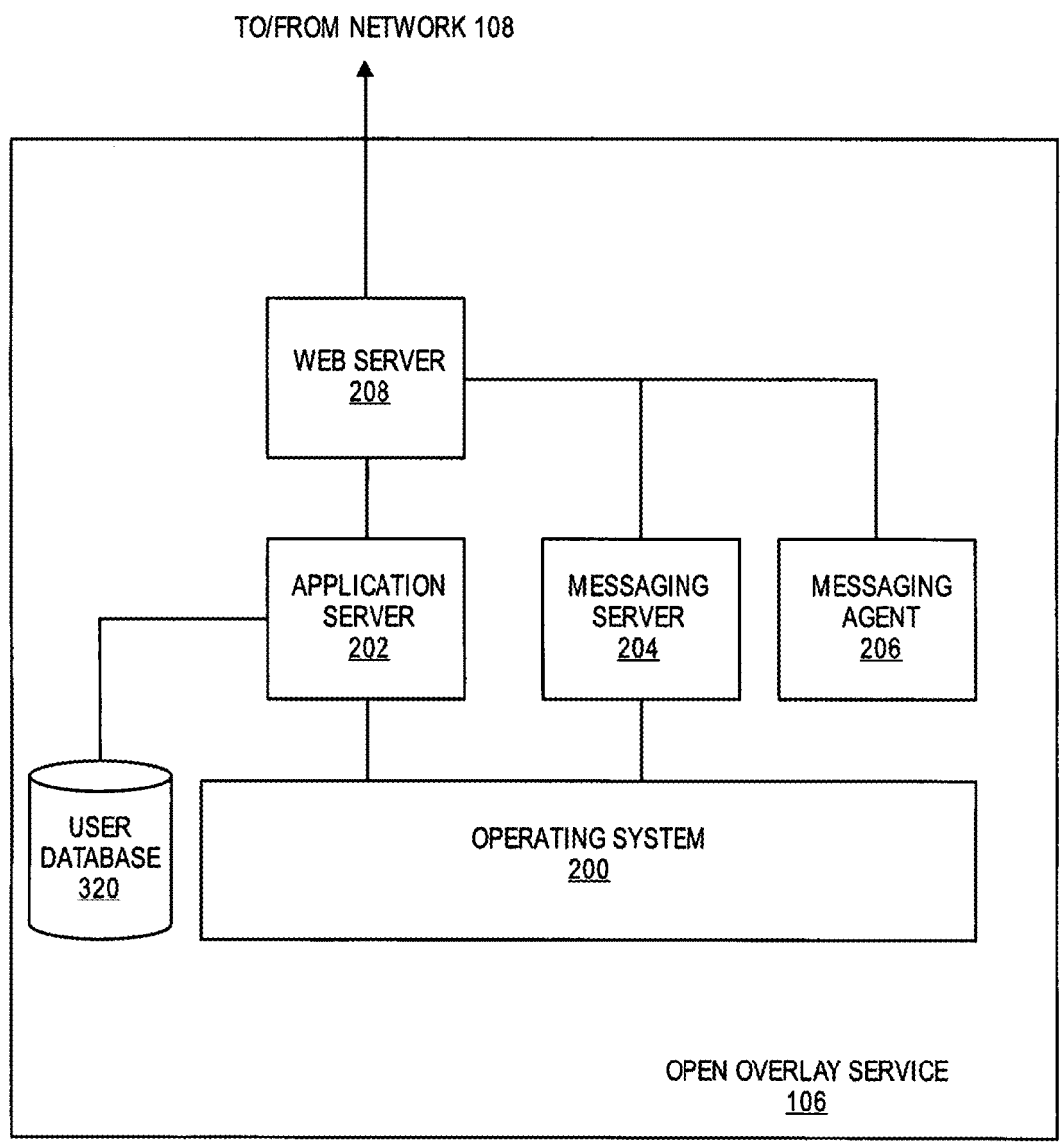
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202.

For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
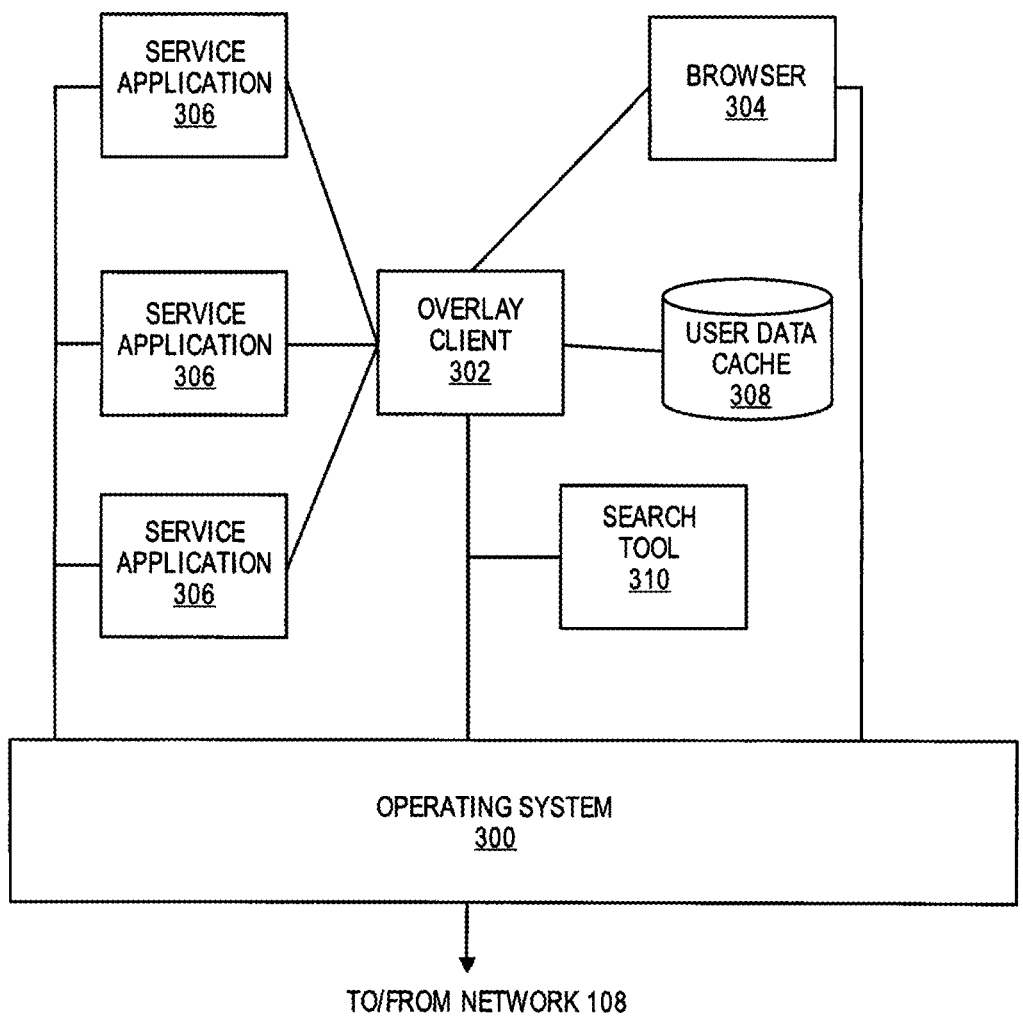
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order to illustrate some of the features of open overlay service 106 that provide a live social context, the virtual persona feature will now be described. A virtual persona is virtual in that it only appears to be a subscriber of open overlay service 106. However, the person of the virtual persona may not have a real account with open overlay service 106. The person emulated by the virtual persona may or may not own the accounts attributed to the virtual persona.

The virtual persona allows its creator to easily follow the activities, such as blog updates, RSS feeds, etc., on online services 104 of the other person without having to establish accounts at these services or having to visit these services regularly checking for updates. The virtual persona also serves as a pre-configured account that may have its settings copied over to configure an account when the real person joins open overlay service 106. For example, after establishing the virtual persona, the creator may send an invitation to the real person being emulated. Upon accepting, the virtual persona is copied for the real person and that person may then continue to use the services already established. Thus, the virtual persona can be used to generate a real profile of a real user on-the-fly. The creator of the virtual persona remains in control of the virtual persona. If the real person accepts the invitation, the creator may choose to remove the virtual persona. However, the creator of the virtual persona may choose to maintain it, for example, as a backup copy for their own use.

Figure 4:
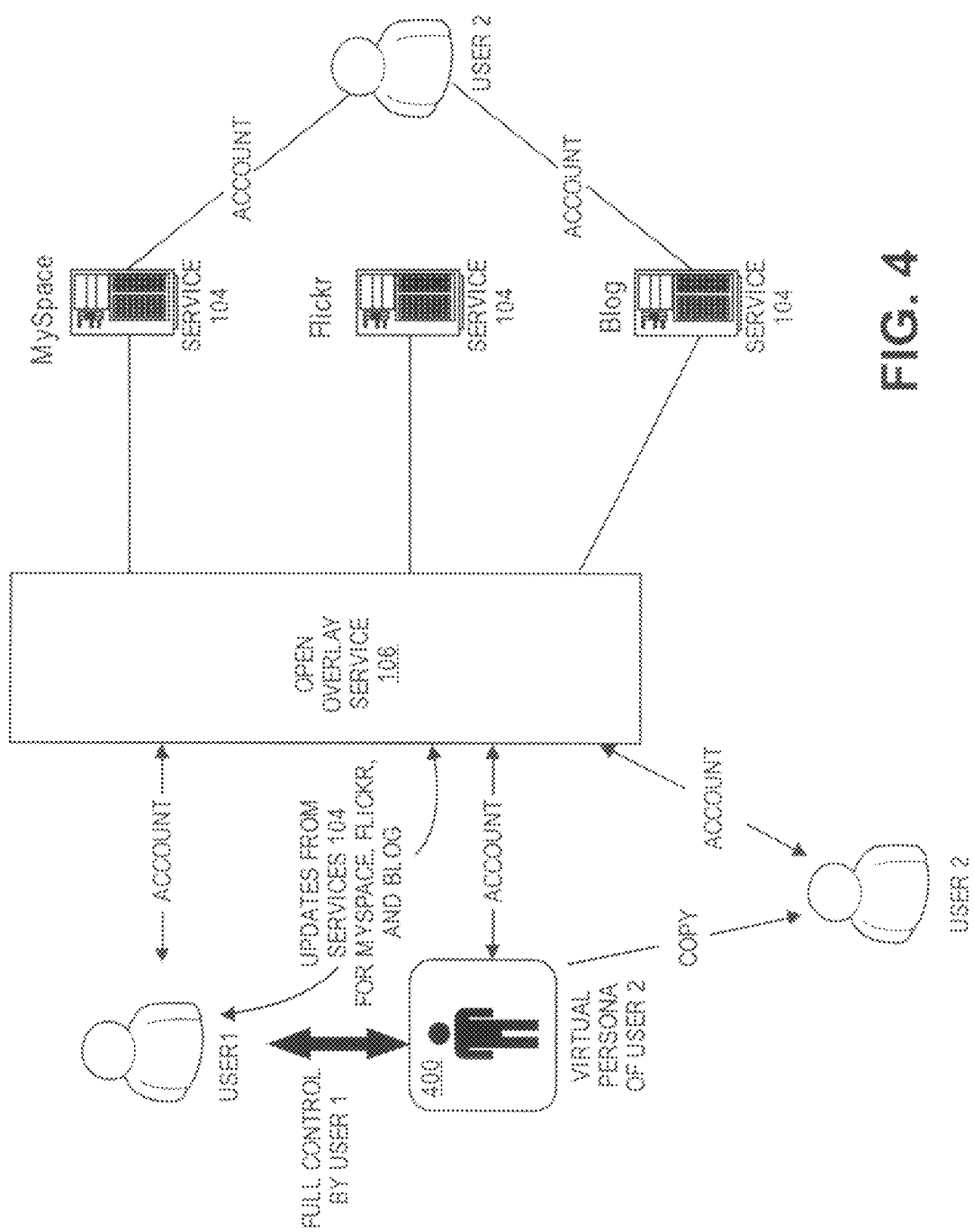
FIG. 4 illustrates the concept of a virtual persona employed by the present invention.

FIG. 4 will now be explained to illustrate the concept of a virtual persona. As shown, user 1 has an account with open overlay service 106 and uses service 106 to interface with various online services 104, which are shown as corresponding to MySpace, Flickr, and a blog. As noted above, open overlay service 106 provides a single, dynamic social context that user 1 may use to track the activities on these online services 104.

Meanwhile, user 2 is also a member of only the MySpace and blog online services 104, but is not a member of the Flickr online service 104 or open overlay service 106. Of note, one skilled in the art will recognize user 1 and user 2 may have accounts with different online services 104 that may or may not be in common.

For various reasons, user 1 may be interested in following the activities of user 2. For example, user 1 and user 2 may be friends. Of course, user 2 may simply be a person who is known to user 1, but otherwise has no relationship with user 1. Nonetheless, user 1 may decide to establish a virtual persona 400 of user 2 as described in FIG. 5.

Virtual persona 400 emulates user 2 and is provided an account with open overlay service 106. Accordingly, user 1 may provide account information of user 2 so that open overlay service 106 can track the activities of user 2. For example, various online services merely require an account identifier, such as screen name, in order to allow a person to see activity of another person. This is a common feature of many social network services because it facilitates the discovery and meeting between fellow members of that service. The present invention takes advantage of this feature and uses it configure the profile of virtual persona 400.

In setting up virtual persona 400, user 1 may also configure other aspects of the services provided by open overlay service 106, such as privacy options. Virtual persona 400 thus allows user 1 freedom to set up virtual persona 400 to suit his/her preferences without bothering user 2. Even if user 2 has an account with open overlay service 106, virtual persona 400 allows user 1 to configure virtual persona 400 with web accounts that were not listed by user 2, but are known to user 1.

One skilled in the art will also recognize that reference to MySpace, Flickr, and a blog are merely non-limiting examples. Any sort of online service may be tracked using the virtual persona of the present invention. For example, the present invention may also be used to: track a movie rental service, such as Netflix, to see which movies user 2 is receiving via a RSS feed; a consumer site, such as Amazon via their web services interface; and a movie sharing service, such as YouTube, via a RSS feed.

Furthermore, the activities of user 2 at a particular online service may be tracked, even if user 1 does not have an account at that online service. For example, user 1 may be able to view Picasa photos, even when user 1 does not have a Picasa account. This aspect of the virtual persona helps user 1 avoid having to visit multiple sites and multiple web pages to track the activities of user 2. That is, a virtual persona can provide an aggregated view of the activities of user 2 to user 1 at a single location.

For the example shown in FIG. 4, user 1 configures virtual persona 400 with account information for MySpace and blog online services 104. Open overlay service 106 interfaces with these online services 104 and then may provide updates that indicates the activity of user 2 at these services 104. In other words, virtual persona 400 essentially makes it appear that user 2 has an account on open overlay service 106, even though he/she does not. The description will now explain how virtual persona 400 can be established and used to facilitate the invitation process of open overlay service 106.

Figure 5:
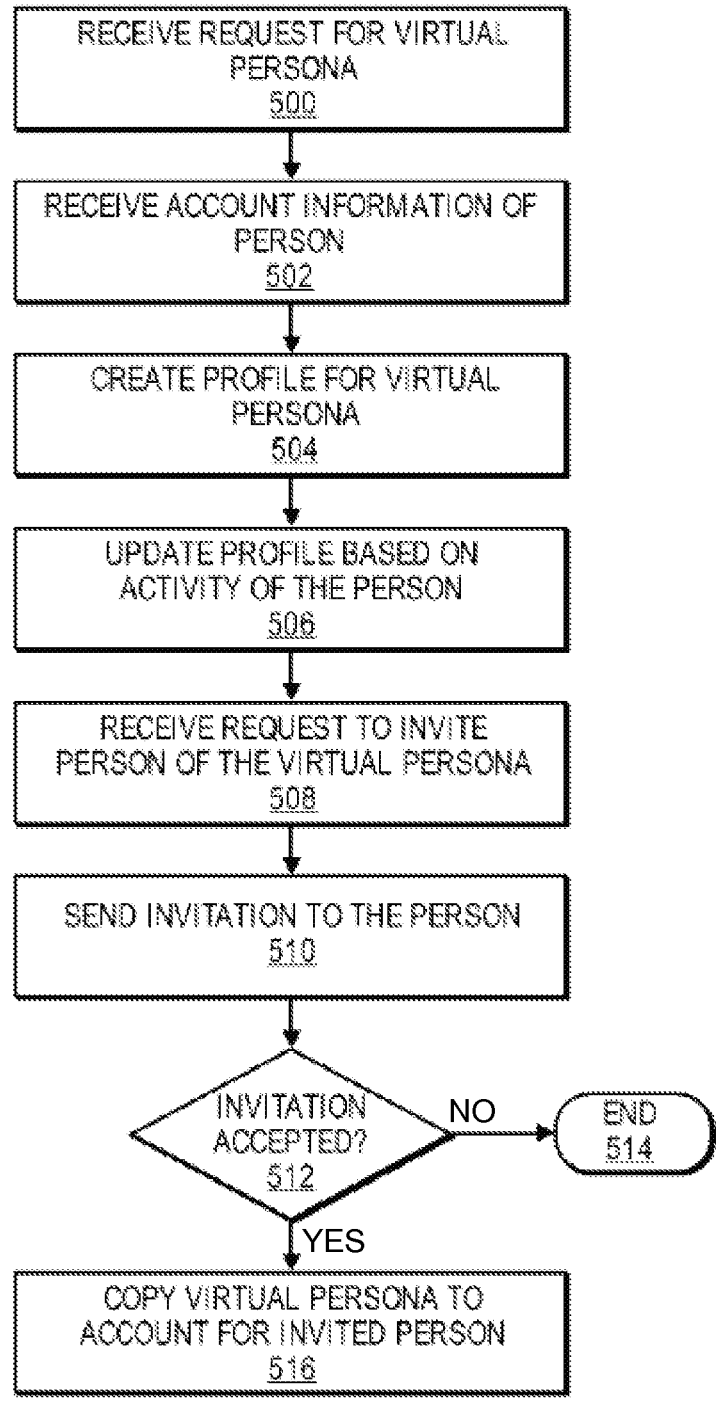
FIG. 5 illustrates an exemplary process flow for creating a virtual persona for a person and eventually inviting that person in accordance with the present invention.

FIG. 5 illustrates an exemplary process flow for creating a virtual persona for a person and eventually inviting that person in accordance with the present invention. For illustrative purposes, FIG. 5 will be explained based on the example scenario shown in FIG. 4 between user 1 and user 2.

In phase 500, open overlay service 106 receives a request for a virtual persona of a person. For example, user 1 may request a virtual persona 400 for user 2.

In phase 502, open overlay service 106 receives account information to one or more online services held by user 2. In particular, in the present example, user 1 may provide the account identifier of user 2 for the MySpace and blog services 104.

In phase 504, open overlay service 106 creates a profile for the virtual persona 400 based on this account information. Open overlay service 106 may utilize its normal processes to create this profile in a manner similar to an account for a real person. However, open overlay service 106 may configure the rights of virtual persona 400 depending on several factors, such as whether user 2 has an account on open overlay service 106 (not shown), whether virtual persona 400 should be viewable by users other than user 1, and whether user 2 should be notified when user 1 requests creation of virtual persona 400 for user 2. For example, virtual persona 400 may be viewable to other users of open overlay service 106 if user 1 elects to share this profile. As another example, virtual persona 400 may made viewable by user 2, i.e., the person being emulated, when they are invited to join open overlay service 106. Viewing virtual persona 400 may perhaps be useful, for example, to assist user 2 in deciding whether to join open overlay service 106. Of course, the creator of virtual persona 400 (i.e., user 1) may be have administrative rights to edit or remove virtual persona 400 as desired. One skilled in the art will recognize that other policy implementations may be employed by the present invention.

In phase 506, open overlay service 106 performs its normal functions to update virtual persona 400 to reflect the activities of user 2. In this example, virtual persona 400 thus reflects the activity of user 2 on the MySpace and blog services 104 and user 1 will be able to view these updates.

Eventually, user 1 may desire to have user 2 join him/her on open overlay service 106. In phase 508, user 1 may trigger open overlay service 106 to request an invitation process for user 2. As part of this process, user 1 may provide a contact address, such as an email address or instant messenger name, for user 2. As noted, at this time, user 2 may be invited to view virtual persona 400 to help him/her to decide whether to join open overlay service 106 by previewing the features of this service.

In phase 510, open overlay service 106 sends an invitation to user 2. In some embodiments, the invitation at this time provides information that indicates the existence of the virtual persona 400 and/or the identity of user 1. This feature allows user 1 to pre-package an account for user 2 on open overlay service 106 to ease the migration process and encourage user 2 to join. For user 2, they may view the settings and aggregated activities of virtual persona 400 to help them decide whether to join.

In phase 512, open overlay service 106 determines whether user 2 has accepted the invitation. For example, user 2 may indicate acceptance based on a return email, an instant message, or browsing to a particular web page address on network 108. If user 2 does not accept the invitation (or perhaps ignores it), then processing ends at stage 514. Nonetheless, open overlay service 106 may continue with updating virtual persona 400. In some embodiments, open overlay service 106 notifies user 1 that the invitation was rejected.

If user 2 accepts the invitation, then processing flows to stage 516 where user 2 is provided access to an account with settings copied from virtual persona 400. User 2 is thus given a running account that is already pre-configured for operations. For example, the account for user 2 has already established interfaces with the MySpace and blog online services 104 with the account identifiers of user 2. This allows user 2 to easily begin using open overlay service 106.

When establishing the account for user 2, open overlay service 106 may convert the profile of virtual persona into a real account, or may create a new account and copy the configuration from the profile of virtual persona 400. In addition, user 1 may be allowed to have some control over virtual persona 400 even after user 2 has joined open overlay service 106. For example, user 1 may remain in control of virtual persona 400 and keep using it to track the activities of user 2. Of course, user 1 may likely remove virtual persona 400 once user 2 has joined open overlay service 106. However, user 1 may also choose to maintain virtual persona 400 for various reasons, such as to serve as a backup copy. Meanwhile, user 2 may continue with their own account independent of virtual persona 400. Future changes to the account of user 2 do not affect virtual persona 400 and vice versa.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving, from a first client device associated with a requesting user having a first account in a social network overlay service, a request to establish a virtual social network account in the social network overlay service, the virtual social network account being associated with a target user that is not a subscriber of the social network overlay service;
   receiving, from the first client device, an identifier associated with a profile of the target user on a plurality of online services subscribed to by the target user and implemented on one or more servers;
   determining that the plurality of online services implemented on the one or more servers prevent a direct interface with the social network overlay service;
   responsive to determining that the plurality of online services prevent the direct interface, causing, by a processor associated with the social network overlay service, data-scraping of the plurality of online services to be initiated on the first client device in view of the identifier associated with the target user, wherein causing the data-scraping to be initiated comprises causing a social network overlay client running on the first client device to instruct a plurality of online service applications running on the first client device to request data from corresponding ones of the plurality of online services implemented on the one or more servers, the data comprising concurrent activity data associated with the identifier on the plurality of online services, the concurrent activity data indicating that one or more messages have been entered on the plurality of online services, the plurality of online service applications to receive the data from the corresponding ones of the plurality of online services in a response to the request, and wherein the social network overlay client to detect the response and forward the data to the social network overlay service;

receiving, from the first client device, the concurrent activity data associated with the identifier on the plurality of online services;

in response to receiving the concurrent activity data from the first client device, aggregating the concurrent activity data associated with the identifier on the plurality of online services into aggregated activity data;

creating, by the processor, the virtual social network account corresponding to the target user in the social network overlay service in view of the aggregated activity data, wherein the virtual social network account is caused to be displayed by the first client device associated with the requesting user via the social network overlay service; and providing, to the first account in the social network overlay service associated with the requesting user, updates to the virtual social network account in the social network overlay service associated with the target user in view of new activity data identified from the data-scraping of the plurality of online services via the social network overlay service.

2. The method of claim 1, further comprising:
receiving a contact address for the target user;
sending an invitation to a second client device associated with the target user to view settings and activity updates of the virtual social network account; and
receiving an acceptance from the second client device to subscribe to the social network overlay service; and
creating, by the processor, an account for the target user in view of the acceptance from the target user, using account settings of the virtual social network account for the target user.

3. The method of claim 1, further comprising:
receiving a contact address for the target user; and
sending an invitation to a second client device associated with the target user to start using a social network account preconfigured in view of the virtual social network account, the invitation comprising activity updates copied from the virtual social network account.

4. The method of claim 1, wherein receiving the identifier associated with a profile of the target user on the plurality of online services comprises receiving an account identifier to a web log.

5. The method of claim 1, wherein receiving the identifier associated with a profile of the target user on the plurality of online services comprises receiving an account identifier to a photo sharing service.

6. The method of claim 1, wherein receiving the identifier associated with a profile of the target user on the plurality of online services comprises receiving an account identifier for a news feed.

7. The method of claim 1, wherein receiving the identifier associated with a profile of the target user on the plurality of online services comprises receiving an account identifier for a social network.

8. The method of claim 1, wherein creating the virtual social network account comprises creating an account that is viewable only by the requesting user of the virtual social network account.

9. The method of claim 1, wherein creating the virtual social network account comprises creating an account that is viewable by other users of the social network overlay service.

10. The method of claim 1, wherein creating the virtual social network account comprises creating an account that is viewable by a non-user of the social network overlay service with whom the virtual social network account is shared.

11. A system comprising:
a processor to create, edit, and remove a virtual social network account via a social network overlay service, wherein the virtual social network account corresponds to a non-subscriber of the social network overlay service in view of a request from a first client device associated with a subscriber, and to receive, from the first client device, an identifier associated with a profile of the non-subscriber on a plurality of online services subscribed to by the non-subscriber and implemented on the one or more servers, wherein at least one of the plurality of online services is not subscribed to by the subscriber, wherein the virtual social network account corresponds to the non-subscriber in view of activity data associated with the identifier on the plurality of online services, and wherein the processor is further to execute:
a messaging agent of the social network overlay service to interface with the plurality of online services subscribed to by the non-subscriber and to obtain, using the identifier, updates about activities of the non-subscriber within the plurality of online services; and
a messaging server to:
determine that the plurality of online services implemented on the one or more servers prevent a direct interface with the social network overlay service;
responsive to determining that the plurality of online services prevent the direct interface, cause, by the social network overlay service, data-scraping of the plurality of online services to be initiated on the first client device for the activity data in view of the identifier associated with the non-subscriber, wherein to cause the data-scraping to be initiated, the messaging server to cause a social network overlay client running on the first client device to instruct a plurality of online service applications running on the first client device to request data from corresponding ones of the plurality of online services implemented on the one or more servers, the data comprising concurrent activity data associated with the identifier on the plurality of online services, the concurrent activity data indicating that one or more messages have been entered on the plurality of online services, the plurality of online service applications to receive the data from the corresponding ones of the plurality of online services in a response to the request, and wherein the social network overlay client to detect the response and forward the data to the social network overlay service;

receive, from the first client device, the concurrent activity data associated with the identifier on the plurality of online services;

in response to receiving the concurrent activity data associated with the identifier from the first client device, aggregate the concurrent activity data on the plurality of online services into aggregated activity data;

update the virtual social network account for the non-subscriber in view of the aggregated activity data being identified from data-scraping of the plurality of online services on the first client device via the social network overlay service; and message the subscriber in response to the update to the virtual social network account.

12. The system of claim 11, wherein the processor is further to:

receive contact information of the non-subscriber, send an invitation to a second client device associated with the non-subscriber to assume ownership of the virtual social network account;

receive an acceptance to the invitation from the second client device; and create a virtual social network account for the non-subscriber using the data for the virtual social network account.

13. The system of claim 12, wherein the messaging server is to send updates about the virtual social network account to the subscriber that created the virtual social network account using the social network overlay service.

14. The system of claim 11, wherein the messaging server is to send photo updates about the virtual social network account to the subscriber that created the virtual social network account.

15. The system of claim 11, wherein the messaging server is to send news feed updates for the virtual social network account to the subscriber that created the virtual social network account.

16. The system of claim 11, wherein the messaging server is to send social network updates for the virtual social network account to the subscriber that created the virtual social network account.

17. The system of claim 11, wherein the processor is to make the virtual social network account accessible by only the subscriber that created the virtual social network account.

18. The system of claim 11, wherein the processor is to make the virtual social network account accessible by other subscribers of the social network overlay service.

19. The system of claim 11, wherein the processor is to make the virtual social network account accessible by a non-subscriber of the social network overlay service with whom the virtual social network account is shared.

20. The system of claim 11, wherein the social network overlay service manages information distribution between a plurality of different and independent social network services that include the plurality of online services subscribed to by the non-subscriber.

21. A non-transitory computer readable storage medium comprising instructions to cause a processor to:

receive, from a first client device associated with a requesting user having a first account in a social network overlay service, a request to establish a virtual social network account in the social network overlay service, the virtual social network account being associated with a target user that is not a subscriber of the social network;

receive, from the first client device, an identifier associated with a profile of the target user on a plurality of online services subscribed to by the target user and implemented on one or more servers;

determine that the plurality of online services implemented on the one or more servers prevent a direct interface with the social network overlay service;

responsive to determining that the plurality of online services prevent the direct interface, cause, by the processor associated with the social network overlay service, data-scraping of the plurality of online services to be initiated on the first client device in view of the identifier associated with the target user for data associated with the target user, wherein to cause the data-scraping to be initiated, the messaging server to cause a social network overlay client running on the first client device to instruct a plurality of online service applications running on the first client device to request data from corresponding ones of the plurality of online services implemented on the one or more servers, the data comprising concurrent activity data associated with the identifier on the plurality of online services, the concurrent activity data indicating that one or more messages have been entered on the plurality of online services, the plurality of online service applications to receive the data from the corresponding ones of the plurality of online services in a response to the request, and wherein the social network overlay client to detect the response and forward the data to the social network overlay service;

receive, from the first client device, the concurrent activity data associated with the identifier on the plurality of online services;

in response to receiving the concurrent activity data from the first client device, aggregate the concurrent activity data associated with the identifier on the plurality of online services into aggregated activity data;

creating, by the processor, the virtual social network account corresponding to the target user in the social network overlay service in view of the aggregated activity data, wherein the virtual social network account is caused to be displayed by the first client device associated with the requesting user via the social network overlay service; and provide, to the first account in the social network overlay service associated with the requesting user, updates to the virtual social network account in the social network overlay service associated with the target user in view of new activity data identified from the data-scraping of the plurality of online services via the social network overlay service.

22. The non-transitory computer readable storage medium of claim 21, the processor further to:

receive a contact address for the target user; and send an invitation to a second client device associated with the target user to create a social network account preconfigured in view of the virtual social network account, the invitation comprising activity updates copied from the virtual social network account.

\* \* \* \* \*